US012627014B2

(12) United States Patent
    Takasu

(10) Patent No.: US 12,627,014 B2
(45) Date of Patent: May 12, 2026

(54) ALKALINE STORAGE BATTERY

(71) Applicant: FDK CORPORATION, Tokyo (JP)

(72) Inventor: Masaru Takasu, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 17/905,257

(22) PCT Filed: Mar. 9, 2021

(86) PCT No.: PCT/JP2021/009101
    § 371 (c)(1),
    (2) Date: Aug. 29, 2022

(87) PCT Pub. No.: WO2021/192978
    PCT Pub. Date: Sep. 30, 2021

(65) Prior Publication Data
    US 2023/0112329 A1     Apr. 13, 2023

(30) Foreign Application Priority Data

Mar. 23, 2020    (JP) ................................ 2020-051202

(51) Int. Cl.
    *H01M 50/586*        (2021.01)
    *H01M 4/24*          (2006.01)
    *H01M 50/538*        (2021.01)
(52) U.S. Cl.
    CPC ........... *H01M 50/586* (2021.01); *H01M 4/24*
             (2013.01); *H01M 50/538* (2021.01)
(58) Field of Classification Search
    CPC ..... H01M 50/533–538; H01M 50/586; H01M
             4/24; H01M 50/107; H01M 50/152;
    (Continued)

(56) References Cited

U.S. PATENT DOCUMENTS 5,491,038 A * 2/1996 DePalma ............ H01M 10/488
                                                       429/93
5,587,259 A * 12/1996 Dopp .................... H01M 4/669
                                                      148/411
            (Continued)

FOREIGN PATENT DOCUMENTS

CN        110034326 A      7/2019
JP        S4860029 U       7/1973
            (Continued)

OTHER PUBLICATIONS

Machine translation of JP-2004022320-A (Year: 2004).*
International Search Report and Written Opinion dated May 25, 2021 for corresponding PCT Application No. PCT/JP2021/009101.

*Primary Examiner* — Adam J Francis
(74) *Attorney, Agent, or Firm* — Kinney & Lange, P.A.

(57)           ABSTRACT

An alkaline storage battery of the present invention includes: an electrode group that includes a positive electrode, a negative electrode, and a separator located between the positive electrode and the negative electrode, which are stacked on top of each other; an outer can that is bottomed cylindrical shape having an opening at the top; a sealing body that seals the outer can; and a positive terminal electrically connected to the sealing body. The positive electrode includes a positive electrode body and a positive electrode protrusion protruding from a portion of the positive electrode body toward the sealing body to connect electrically to the sealing body. The negative electrode includes a negative electrode body and a negative electrode protrusion protruding from a portion of the negative electrode body toward the sealing body and terminating between the sealing body and the negative electrode body. The positive electrode and the negative electrode have a positive electrode active material and a negative electrode active
                    (Continued)

material, respectively, in portions facing each other with the separator therebetween.

1 Claim, 3 Drawing Sheets

(58) Field of Classification Search
CPC ............. H01M 50/184; H01M 50/186; H01M 50/545; H01M 50/534; H01M 50/531; H01M 10/286; H01M 10/345
See application file for complete search history.

(56) References Cited

U.S. PATENT DOCUMENTS

| | | | | |
|---|---|---|---|---|
| 6,432,574 B1 * | 8/2002 | Suzuki | ................ | H01M 50/533 29/623.1 |
| 2008/0057394 A1 * | 3/2008 | Rigobert | ............ | H01M 50/528 29/623.2 |

| | | | | |
|---|---|---|---|---|
| 2013/0004814 A1 * | 1/2013 | Ohashi | .............. | H01M 10/0587 429/94 |
| 2016/0111753 A1 * | 4/2016 | Iwayasu | .............. | H01M 10/052 429/200 |
| 2020/0266404 A1 * | 8/2020 | Shibaoka | ............ | H01M 10/345 |

FOREIGN PATENT DOCUMENTS

| | | | | |
|---|---|---|---|---|
| JP | H11144761 A | 5/1999 | | |
| JP | H11213983 A | 8/1999 | | |
| JP | 2004022320 A | 1/2004 | | |
| JP | 2008066302 A | 3/2008 | | |
| JP | 2015125869 A | 7/2015 | | |
| WO | WO-9640588 A1 * | 12/1996 | ............. | C01G 45/02 |
| WO | WO-2018116567 A1 * | 6/2018 | ............ | H01M 10/28 |

* cited by examiner

WINDING DIRECTION a b

31

33

34

H3

H4

L3

32

L4 a b

30

33

32

34

35

WINDING DIRECTION

ALKALINE STORAGE BATTERY

CROSS-REFERENCE TO RELATED APPLICATION(S)

This application is the national phase of PCT Application No. PCT/JP2021/009101 filed on Mar. 9, 2021, which claims priority to Japanese Application No. 2020-051202 filed on Mar. 23, 2020, the contents of which are incorporated herein by reference in their entirety.

BACKGROUND

Technical Field

The present disclosure relates to an alkaline storage battery, particularly to a cylindrical alkaline storage battery.

Background Art

The alkaline storage battery includes an electrode group having a positive electrode, a negative electrode, and a separator stacked on top of each other. In the electrode group, the separator is located between the positive electrode and the negative electrode. In the alkaline storage battery, for example, the electrode group is wound in a spiral shape and housed with an alkaline electrolyte in a conductive outer can with a bottomed cylindrical shape. In the alkaline storage battery, a predetermined electrochemical reaction occurs between the positive and negative electrodes facing each other with a separator therebetween, thereby causing charge and discharge.

As an example of a battery having an electrode group that is wound in a spiral shape, Patent Document 1, for example, discloses a nickel-metal hydride secondary battery in which an electrode body having a positive electrode and a negative electrode stacked on top of each other with a separator therebetween is housed inside a battery container. To be specific, in the nickel-metal hydride secondary battery disclosed in Patent Document 1, the electrode body includes a positive electrode protrusion that is a portion of the positive electrode protruding toward the sealing body. The positive electrode protrusion is directly connected to the sealing body, and the positive electrode protrusion of the positive electrode is not filled with an active material.

PRIOR ART DOCUMENT

Patent Document

Patent Document 1: JP 2015-125869 A

SUMMARY

In order to increase the capacity of the battery, it is conceivable, for example, to form a thinner separator and increase the amount of active material applied to the positive electrode and negative electrode. However, in the nickel-metal hydride secondary battery disclosed in Patent Document 1, when the separator is made thin and the amounts of positive electrode active material and negative electrode active material are increased, burrs on the positive electrode and negative electrode could break through the separator and cause a short-circuit inside the battery.

An object of the present disclosure, which has been made to solve these problems, is to provide an alkaline storage battery that can achieve high capacity while suppressing internal short-circuits.

To achieve the aforementioned object, an alkaline storage battery of the present disclosure includes: an electrode group that includes a positive electrode with a belt shape, a negative electrode with a belt shape, and a separator with a belt shape located between the positive electrode and the negative electrode, the positive electrode, the negative electrode, and the separator being stacked on top of each other to wind in a spiral shape; an outer can with a bottomed cylindrical shape in which the electrode group is housed together with an alkaline electrolyte, the outer can having an opening at the top; a sealing body that seals the opening of the outer can; and a positive terminal electrically connected to the sealing body. The positive electrode includes a positive electrode body with a belt shape and a positive electrode protrusion protruding from a portion of the positive electrode body toward the sealing body to connect electrically to the sealing body. The negative electrode includes a negative electrode body with a belt shape and a negative electrode protrusion protruding from a portion of the negative electrode body toward the sealing body and terminating between the sealing body and the negative electrode body. The positive electrode and the negative electrode have a positive electrode active material and a negative electrode active material, respectively, in portions facing each other with the separator therebetween.

The alkaline storage battery according to an aspect of the present disclosure, further includes a conductive and elastic connection member that is disposed between the sealing body and the positive electrode protrusion.

In the alkaline storage battery of the present disclosure, the positive electrode includes a positive electrode body with a belt shape and a positive electrode protrusion protruding from a portion of the positive electrode body toward the sealing body to connect electrically to the sealing body. Further, the negative electrode includes a negative electrode body with a belt shape and a negative electrode protrusion protruding from a portion of the negative electrode body toward the sealing body and terminating between the sealing body and the negative electrode body. Furthermore, the positive electrode and the negative electrode have a positive electrode active material and a negative electrode active material, respectively, in portions facing each other with the separator therebetween. Thus, in the alkaline storage battery of the present disclosure, the positive electrode and the negative electrode have a positive electrode protrusion and a negative electrode protrusion separately from a positive electrode body and a negative electrode body, and have a positive electrode active material and a negative electrode active material, respectively, in portions facing each other with the separator therebetween. In other words, making part of the positive electrode and the negative electrode longer in the height direction (in the direction of the axis of the outer can) than other parts allows the battery to have higher capacity without making the electrode group thicker in the thickness direction (the radial direction of the outer can). This also eliminates the need for thinning the separator for increasing the capacity of the battery, thereby suppressing breaking through of the separator due to burrs on the positive electrode and the negative electrode and thus suppressing short-circuits inside the battery. In this way, an alkaline storage battery that can achieve high capacity while suppressing internal short-circuits can be provided.

DETAILED DESCRIPTION

The following explains an embodiment of a nickel-metal hydride secondary battery 1 (hereinafter simply referred to as "battery 1") as an example of an alkaline storage battery embodying the present disclosure. A case in which the present disclosure is applied to an AA size cylindrical battery 1 is described as an embodiment; however, the battery 1 does not necessarily be of this size and may be, for example, in size AAA, or other sizes. The alkaline storage battery may be any battery that uses an alkaline solution as the electrolyte, such as a nickel-cadmium storage battery.

Figure 1:
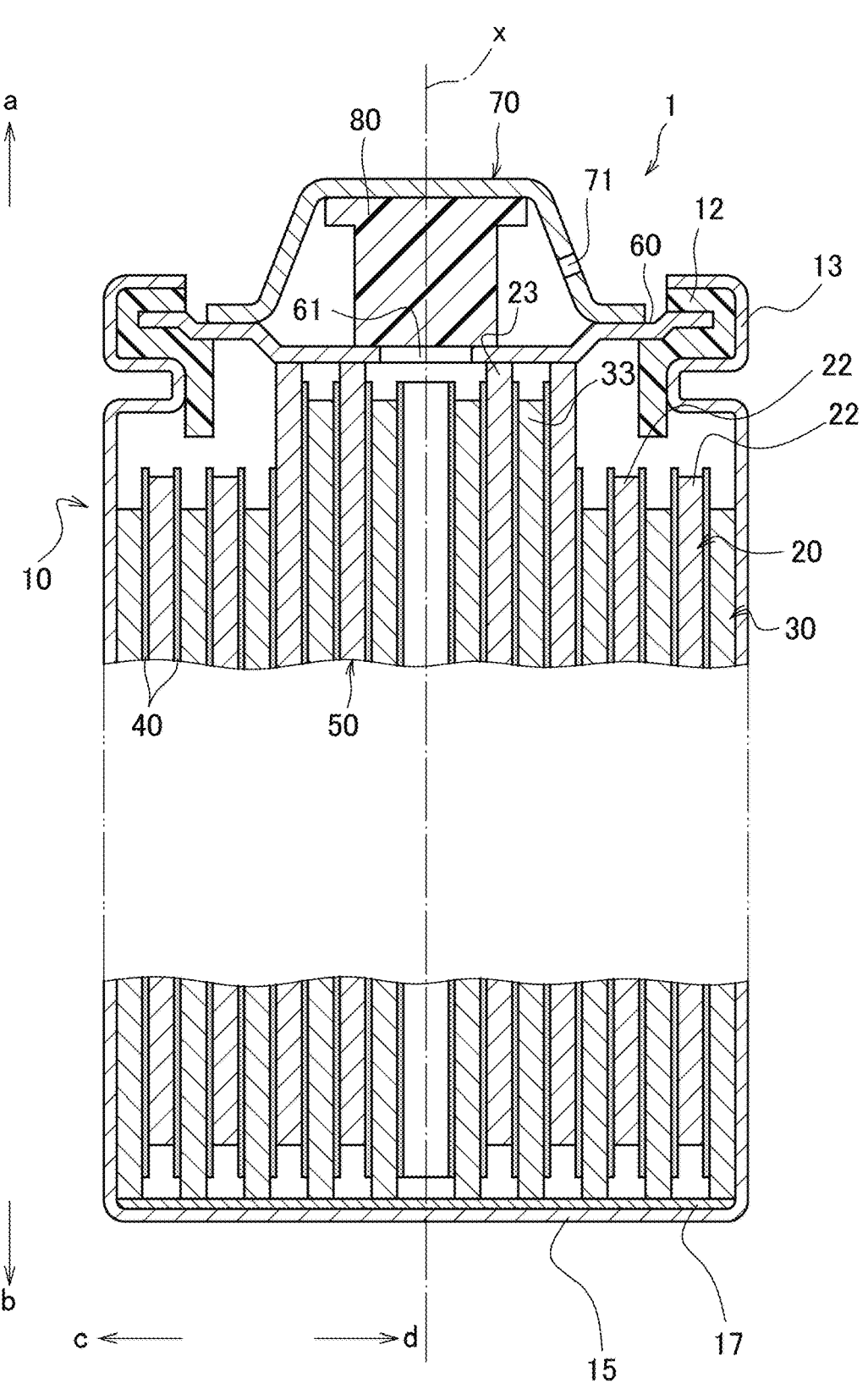
FIG. 1 is a cross-sectional view of a longitudinal section of an alkaline storage battery according to one embodiment.
Figure 2:
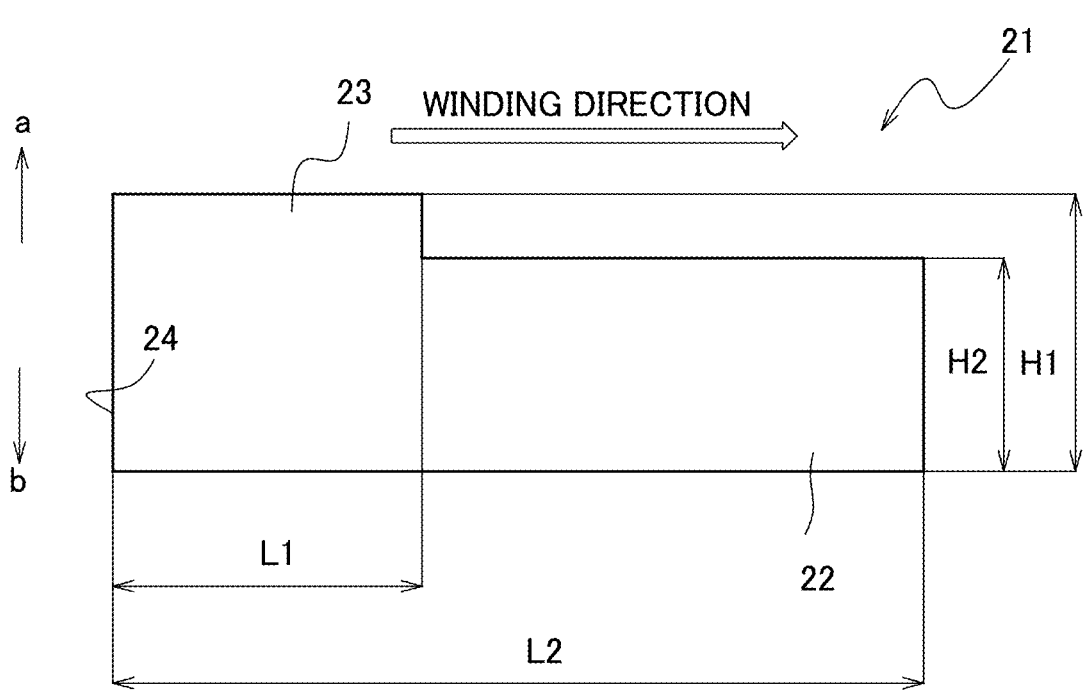
FIG. 2 is a plan view of the positive electrode base of the alkaline storage battery shown in FIG. 1.
Figure 3:
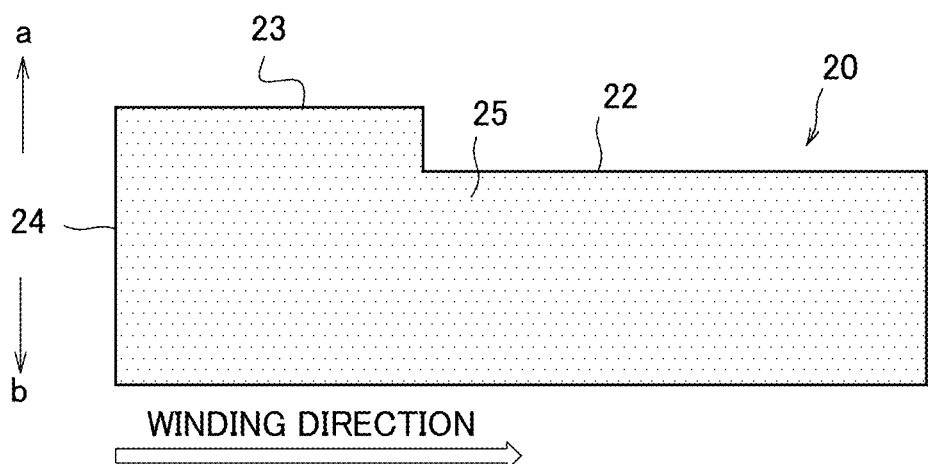
FIG. 3 is a plan view of the positive electrode of the alkaline storage battery shown in FIG. 1.
Figure 4:
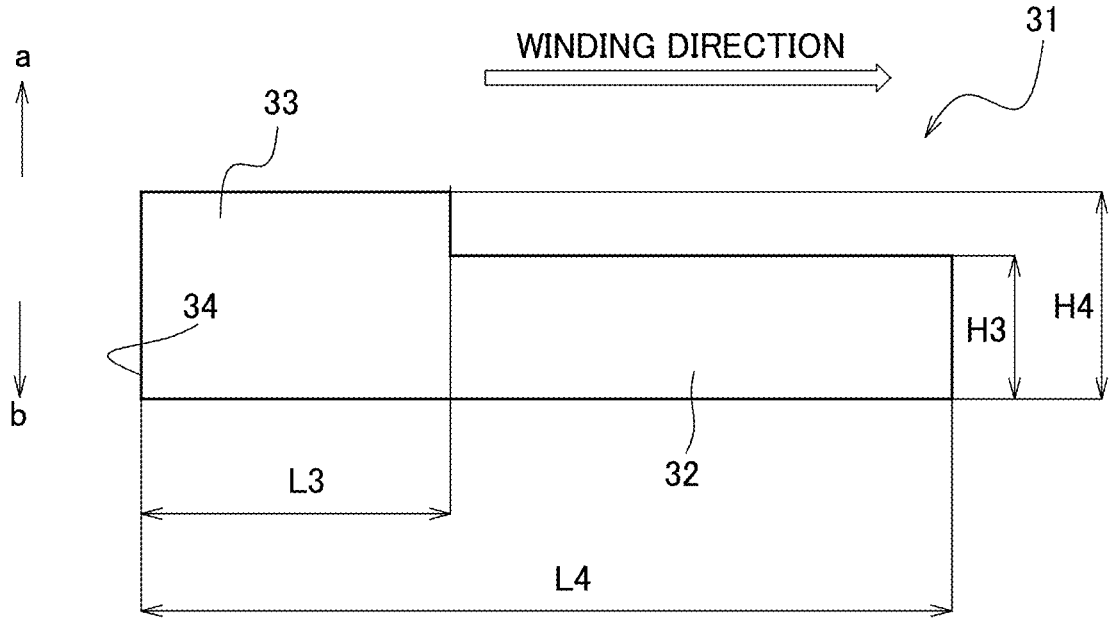
FIG. 4 is a plan view of the negative electrode core of the alkaline storage battery shown in FIG. 1.
Figure 5:
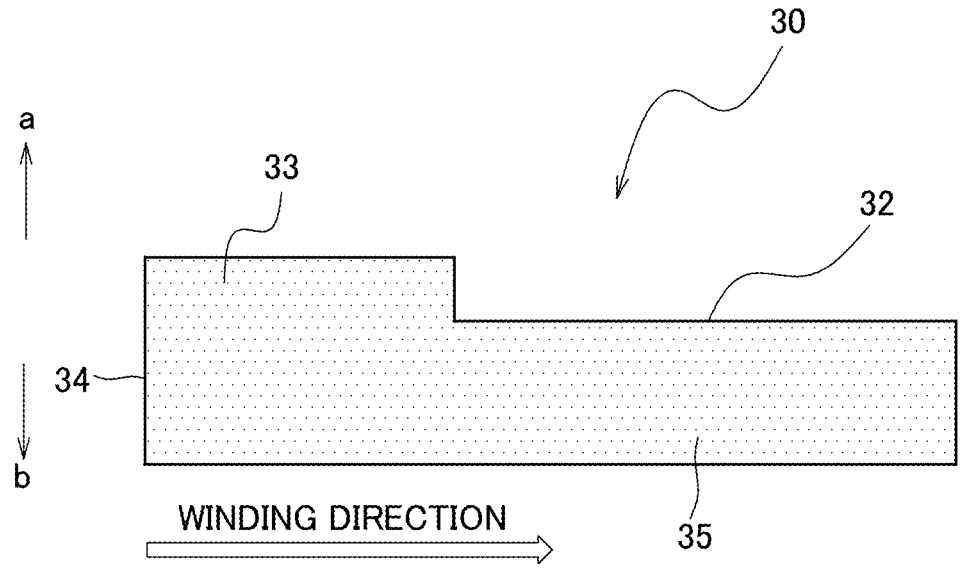
FIG. 5 is a plan view of the negative electrode of the alkaline storage battery shown in FIG. 1.

FIG. 1 is a cross-sectional view of a longitudinal section of a nickel-metal hydride secondary battery 1 (alkaline storage battery) according to one embodiment. FIG. 2 is a plan view of the positive electrode base 21 of the nickel-metal hydride secondary battery 1 shown in FIG. 1. FIG. 3 is a plan view of the positive electrode 20 of the nickel-metal hydride secondary battery 1 shown in FIG. 1. FIG. 4 is a plan view of the negative electrode core 31 of the nickel-metal hydride secondary battery 1 shown in FIG. 1. FIG. 5 is a plan view of the negative electrode 30 of the nickel-metal hydride secondary battery 1 shown in FIG. 1. For convenience of explanation, with respect to the axis x of the cylindrical outer can 10, the arrow a indicates the upper side, and the arrow b indicates the lower side. Here, the upper side refers to the side where the positive terminal 70 of the battery 1 is provided, and the lower side refers to the side where the bottom wall 15 of the battery 1 is provided and the side opposite to the upper side. With respect to the direction perpendicular to the axis x (hereinafter referred to as "radial direction"), the direction away from the axis x is the radially outer side (the direction of the arrow c) and the direction toward the axis x is the radially inner side (the direction of the arrow d).

As shown in FIG. 1, the battery 1 has an outer can 10 that is a bottomed cylindrical shape having an opening at the top (the direction of the arrow a). The outer can 10 is conductive, and the bottom wall 15 on the lower side (the direction of the arrow b) serves as the negative terminal. A sealing body 60 for sealing the outer can 10 is fixed to the opening of the outer can 10. This sealing body 60 is a conductive disc-shaped member. The sealing body 60 and an annular insulating gasket 12 surrounding the sealing body 60 are placed inside the opening of the outer can 10, and the insulating gasket 12 is fixed to the opening edge 13 of the outer can 10 by crimping the opening edge 13 of the outer can 10. In other words, the sealing body 60 and the insulating gasket 12 cooperate with each other to hermetically seal the opening of the outer can 10.

Here, the sealing body 60 has a central through hole 61 in the center, and a rubber valve 80 is located on the outer surface, the upper side of the sealing body 60, to plug the central through hole 61. Furthermore, a metal positive terminal 70 with a flange is electrically connected to the outer surface of the sealing body 60 so as to cover the valve

80. This positive terminal 70 pressurizes the valve 80 toward the sealing body 60. Note that the positive terminal 70 has a gas venting hole 71.

Under normal conditions, the central through hole 61 is hermetically closed with the valve 80. Meanwhile, if gas is generated in the outer can 10 and the gas pressure increases, the valve 80 is compressed by the gas pressure to open the central through hole 61. As a result, gas is released from inside the outer can 10 through the central through hole 61 and the gas venting hole 71 of the positive terminal 70. In other words, the central through hole 61 of the sealing body 60, the valve 80, and the gas venting hole 71 of the positive terminal 70 are form a safety valve for the battery 1.

The outer can 10 houses an electrode group 50. This electrode group 50 has a positive electrode 20 with a belt shape, negative electrode 30, and separator 40 are stacked on top of each other. The electrode group 50 is wound into a spiral shape with the separator 40 sandwiched between the positive electrode 20 and the negative electrode 30. In other words, the positive electrode 20 and the negative electrode 30 are stacked on top of each other with the separator 40 therebetween. In addition, a circular lower insulating member 17 is located between the electrode group 50 and the bottom wall 15 of the outer can 10.

Also, a predetermined amount of alkaline electrolyte (not shown in the drawing) has been filled into the outer can 10. This alkaline electrolyte is soaked into the electrode group 50 to promote an electrochemical reaction (charging and discharging reaction) during charging and discharging between the positive electrode 20 and the negative electrode 30. This alkaline electrolyte is preferably an aqueous solution containing at least one of KOH, NaOH, and LiOH as a solute.

Examples of material for the separator 40 include polyamide fiber nonwoven fabric with hydrophilic functional groups, polyolefin fiber nonwoven fabric, such as polyethylene and polypropylene, with hydrophilic functional groups.

As shown in FIGS. 1 to 3, the positive electrode 20 includes a positive electrode body 22 with a belt shape, and a positive electrode protrusion 23 protruding from a portion of the positive electrode body 22 toward the upper side of the sealing body 60 (in the direction of arrow a) to connect electrically to the sealing body 60. To be specific, as shown in FIG. 2, the positive electrode body 22 is a belt-shaped member having a predetermined height H2 along the up and down direction. The positive electrode protrusion 23 is a portion that extends upward from the winding beginning edge 24 of the positive electrode body 22 within a range up to a predetermined length L1 from the positive electrode body 22. Here, the predetermined length L1 refers to the range of length of the positive electrode 20 in contact with the sealing body 60 in the state of the electrode group 50. To be specific, it refers to the range of length of the positive electrode 20 that is located on the inner side with respect to the insulating gasket 12 (in the direction of the arrow d) in the state of the electrode group 50. In the portion of the positive electrode protrusion 23, the positive electrode 20 has a height H1 greater than the height H2 of the positive electrode body 22 along the up and down direction. As shown in FIG. 1, in the nickel-metal hydride secondary battery 1, the positive electrode protrusion 23 is in contact with the sealing body 60. In other words, the positive electrode 20 is directly connected to the sealing body 60, which means that the positive terminal 70 and the positive electrode 20 are electrically connected to each other through the sealing body 60.

As shown in FIGS. 2 and 3, the positive electrode 20 includes a conductive positive electrode base 21 having a porous structure and a positive electrode mixture 25 held in the pores of the positive electrode base 21. The positive electrode 20 has the positive electrode mixture 25, which serves as a positive electrode active material, in the portion facing the negative electrode 30, which is described below, with the separator 40 therebetween. To be specific, in the positive electrode 20, the positive electrode mixture 25 is held over the entire surface (both sides) of the positive electrode base 21. Such a positive electrode base 21 can be, for example, a sheet of foamed nickel. The positive electrode mixture 25 contains positive electrode active material particles and a binding agent. Also, the positive electrode additive is added to the positive electrode mixture 25 as needed.

A conductive and elastic connection member (not shown in the drawing) may be placed between the sealing body 60 and the positive electrode protrusion 23. The connection member may have a spiral shape corresponding to the shape of the positive electrode protrusion 23 shown in FIG. 1, or may have a disc shape having a diameter equivalent or substantially equivalent to the outermost diameter of the positive electrode protrusion 23. Note that the connection member, which should electrically connect at least a part of the positive electrode protrusion 23 to the sealing body 60, may have any shape. For example, the connection member may be a conductive member, such as a metallic foil or nickel sponge, attached to the periphery of an elastic member, such as rubber. The connection member is not necessarily as described above as an example and may be any member that has conductivity and elasticity.

The aforementioned binding agent binds the positive electrode active material particles to each other and also binds the positive electrode active material particles to the positive electrode base 21. Examples of the binding agent include carboxymethylcellulose, methylcellulose, polytetrafluoroethylene (PTFE) dispersions, and hydroxypropyl cellulose (HPC) dispersions. Examples of the positive electrode additive include zinc oxide and cobalt hydroxide.

The positive electrode active material particles are nickel hydroxide particles commonly used for nickel-metal hydride secondary batteries. It is preferable to use nickel hydroxide particles that are higher-order nickel hydroxide particles. The aforementioned positive electrode active material particles are produced by a manufacturing method commonly used for nickel-metal hydride secondary batteries.

The positive electrode 20 can be manufactured, for example, in the following manner. First, a positive electrode base 21 molded into a predetermined shape is prepared (FIG. 2). Meanwhile, a positive electrode mixture slurry containing positive electrode active material particles, water, and a binding agent is prepared. The prepared positive electrode mixture slurry is filled into a sheet of foamed nickel serving as the positive electrode base 21 and is dried. After drying, the sheet of foamed nickel filled with nickel hydroxide particles and the like is rolled and then cut to produce the positive electrode 20 (FIG. 3).

The negative electrode 30 is now described. The negative electrode 30 includes a negative electrode body 32 with a belt shape and a negative electrode protrusion 33 that protrudes from a portion of the negative electrode body 32 upward or toward the sealing body 60 to terminate between the sealing body 60 and the negative electrode body 32. To be specific, as shown in FIG. 4, the negative electrode body 32 is a belt-shaped member having a predetermined height H3 along the up and down direction. The negative electrode protrusion 33 is a portion that extends upward from the winding beginning edge 34 of the negative electrode body 32 within a range up to a predetermined length L3 from the negative electrode body 32. Here, the predetermined length L3 refers to the range of length of the negative electrode 30 facing the positive electrode protrusion 23 of the positive electrode 20 in the state of the electrode group 50. In the portion of the negative electrode protrusion 33, the negative electrode 30 has a height H3 greater than the height H4 of the negative electrode body 32 along the up and down direction. As shown in FIG. 1, in the nickel-metal hydride secondary battery 1, the negative electrode protrusion 33 is not in contact with the sealing body 60. In other words, the negative electrode 30 is not connected to the sealing body 60.

As shown in FIGS. 4 and 5, the negative electrode 30 has a metal negative electrode core 31 and a negative electrode mixture 35 containing the negative electrode active material held on the negative electrode core 31. The negative electrode core 31 is conductive. To be specific, the negative electrode 30 has the negative electrode active material in the portion facing the positive electrode 20 with the separator 40 therebetween. To be specific, in the negative electrode 30, the negative electrode mixture 35 is held over the entire surface (both sides) of the negative electrode core 31. The negative electrode 30 is electrically connected to the outer can 10 in a state where it is in contact with the inner periphery of the outer can 10 serving as the negative terminal of the nickel-metal hydride secondary battery 1.

The negative electrode core 31 is a belt-shaped metal material with through holes (not shown in the drawing) distributed, and may be, for example, a perforated metal sheet. The negative electrode mixture 35 is a negative electrode mixture containing a negative electrode active material. The negative electrode mixture 35 is not only filled into the through holes of the negative electrode core 31, but is also layered on the top and rear surfaces of the negative electrode core 31, forming a layer of negative electrode mixture 35. The negative electrode mixture 35 contains hydrogen storage alloy particles that can absorb and release hydrogen as the negative electrode active material, a conductive agent, a binding agent, and a negative electrode auxiliary agent.

The aforementioned binding agent binds the hydrogen storage alloy particles, conductive agent, and the like together and also binds the hydrogen storage alloy particles, conductive agent, and the like to the negative electrode core 31. The binding agent is not particularly limited, and may be chosen from any binding agents that are commonly used for nickel-metal hydride secondary batteries, such as hydrophilic or hydrophobic polymers, and carboxymethylcellulose, for example. The negative electrode auxiliary agent may be styrene butadiene rubber, sodium polyacrylate, or the like. The hydrogen absorbing alloy for the hydrogen storage alloy particles is not particularly limited, and is preferably one commonly used in nickel-metal hydride secondary batteries. The conductive agent is one commonly used for negative electrodes of nickel-metal hydride secondary batteries. For example, carbon black is used.

The negative electrode 30 can be manufactured, for example, in the following manner. First, prepare a negative electrode core 31 molded into a predetermined shape (FIG. 4). Meanwhile, hydrogen absorbing alloy powder, which is an aggregate of hydrogen storage alloy particles described above, a conductive agent, a binding agent, and water are prepared, and these are blended to prepare a paste of negative electrode mixture. The resulting paste is applied to the negative electrode core 31 and then dried. After drying, the density of the negative electrode mixture 35 is adjusted to a predetermined value in a rolling step in which the negative electrode 30 is entirely rolled. The negative electrode 30 is produced in this way.

The positive electrode 20 and negative electrode 30 produced as described above are wound together into a spiral shape with the separator 40 therebetween, forming an electrode group 50. The electrode group 50 obtained in this manner is housed in the outer can 10. Subsequently, a predetermined amount of alkaline electrolyte is filled into the outer can 10. Afterward, the outer can 10 containing the electrode group 50 and the alkaline electrolyte is sealed with a sealing body 60 that has the positive terminal 70, yielding a battery 1 according to the embodiment. The battery 1 is subjected to an initial activation process to be made ready for use.

Next, the action and effects of the battery 1 of one embodiment of the present disclosure are described. As described above, according to the nickel-metal hydride secondary battery 1 of one embodiment, the positive electrode 20 includes a positive electrode body 22 with a belt shape and a positive electrode protrusion 23 that protrudes from a portion of the positive electrode body 22 toward the sealing body 60 to connect electrically to the sealing body 60. The negative electrode 30 includes a negative electrode body 32 with a belt shape and a negative electrode protrusion 33 that protrudes from a portion of the negative electrode body 32 toward the sealing body 60 and is terminated between the sealing body 60 and the negative electrode body 32. Furthermore, the positive electrode 20 and the negative electrode 30 have a positive electrode active material and a negative electrode active material, respectively, in portions facing each other with the separator 40 therebetween. Thus, in the battery 1 according to one embodiment, the positive electrode 20 and the negative electrode 30 have a positive electrode protrusion 23 and a negative electrode protrusion 33 separately from a positive electrode body 22 and a negative electrode body 32, and have a positive electrode active material and a negative electrode active material, respectively, in portions facing each other with the separator 40 therebetween. In other words, making part of the positive electrode 20 and the negative electrode 30 longer in the height direction (in the direction of the axis x of the outer can 10) allows the battery 1 to have higher capacity without making the electrode group 50 thicker in the thickness direction (the radial direction of the outer can 10). This also eliminates the need for thinning the separator 40 for increasing the capacity of the battery 1, thereby suppressing breaking through of the separator 40 due to burrs on the positive electrode 20 and the negative electrode 30 and thus suppressing short-circuits inside the battery 1. In this way, a battery 1 that can achieve high capacity while suppressing the occurrence of internal short-circuits can be provided.

The battery 1 according to the embodiment further includes a conductive and elastic connection member between the sealing body 60 and the positive electrode protrusion 23. Thus, in the battery 1 according to the embodiment, even if, for example, the positive electrode protrusion 23 is not in direct contact with the sealing body 60, an electrical connection can reliably be established between the sealing body 60 and the positive electrode 20.

TABLE 1

|  |  | EXAMPLE | COMPARATIVE EXAMPLE 1 | COMPARATIVE EXAMPLE 2 |
|---|---|---|---|---|
| BATTERY HEIGHT |  | 1 | 1 | 1 |
| POSITIVE | LENGTH | 1 | 1 | 1 |
| ELECTRODE | HEIGHT | H1 = 1.04 | 1 | 1 |
|  |  | H2 = 1 |  |  |
|  | THICKNESS | 1 | 1 | 1.02 |
| NEGATIVE | LENGTH | 1 | 1 | 1 |
| ELECTRODE | HEIGHT | H1 = 1.04 | 1 | 1 |
|  |  | H2 = 1 |  |  |
|  | THICKNESS | 1 | 1 | 1.02 |
| SHORT-CIRCUIT |  | 0/100cells | 0/100cells | 3/100cells |
| DISCHARGE CAPACITY |  | 1 | 0.98 | 1.005 |

Example and Comparative Examples 1 and 2

Table 1 above shows a comparison between the number of short-circuits and discharge capacity for the battery of the Example and that of Comparative Examples 1 and 2, where 100 cells were manufactured for each battery. The test conditions were as follows: charge time was "0.1C×16H", pause time was "1H", and discharge time was "0.2C". Here, "C" refers to the speed of charging and discharging, and "1C" refers to the current value for full charge or full discharge in 1H. In particular, under these test conditions, it is charged for 16H at a charging speed at which it is fully charged in 10 hours, and following a pause of 1H, it is discharged at a discharging speed of 5 hours for full discharge. The numeric data in Table 1 is shown as that compared with reference to the experimental values in the Example.

[Battery Height]

In the Example, the battery height, i.e., the distance between the bottom surface of the bottom wall 15 and the top surface of the positive terminal 70 in the direction of the axis x in FIG. 1, is Reference "1". The battery height of Comparative Examples 1 and 2 is equal to the battery height of the Example.

[Positive Electrode]

In the Example, the total length of the positive electrode 20, L2 (see FIG. 2), is Reference "1". The total length of the positive electrodes of Comparative Examples 1 and 2 is equal to the total length of the positive electrode 20 of the Example.

In the Example, the height of the positive electrode 20, i.e., the height H2 (FIG. 2) of the positive electrode body 22, is Reference "1", and the height H1 (FIG. 2) at the positive electrode protrusion 23 of the positive electrode 20 is "1.04". In this case, L1:L2=1:1.72. The height of the positive electrodes of Comparative Examples 1 and 2 is equal to the height H2 of the positive electrode body 22 of the Example. In other words, the positive electrodes of Comparative Examples 1 and 2 have a rectangular shape with the length L2 and height H2.

9 | 10

In the Example, the thickness of the positive electrode 20, i.e., the thickness including the positive electrode base 21 and the positive electrode mixture 25, is Reference "1". The thickness of the positive electrode of Comparative Example 1 is equal to the thickness of the positive electrode 20 of the Example, and the thickness of the positive electrode of Comparative Example 2 is "1.02" unlike the thickness of the positive electrode 20 of the Example. In particular, in Comparative Example 2, more positive electrode mixture than the amount of positive electrode mixture in the Example was applied.

As described above, a positive electrode base molded into a predetermined shape is prepared (FIG. 2). Meanwhile, a positive electrode mixture slurry containing positive electrode active material particles, water, and a binding agent is prepared. The prepared positive electrode mixture slurry is filled into a sheet of foamed nickel as the positive electrode base and is dried. After drying, the sheet of foamed nickel filled with nickel hydroxide particles and the like is rolled and then cut to produce a positive electrode. One hundred cells of such positive electrodes were manufactured (FIG. 3).

[Negative Electrode]

In the Example, the total length of the negative electrode 30, L4 (see FIG. 4), is Reference "1". The total length of the negative electrodes of Comparative Examples 1 and 2 is equal to the total length of the negative electrode 30 of the Example.

In the Example, the height of the negative electrode, i.e., the height H3 (FIG. 4) of the negative electrode body 32, is Reference "1", and the height H4 (FIG. 4) at the negative electrode protrusion 33 of the negative electrode 30 is "1.04". In this case, L3:L4=1:2.72. The height of the negative electrodes of Comparative Examples 1 and 2 is equal to the height H3 of the negative electrode body 32 of the Example. In other words, the negative electrodes of Comparative Examples 1 and 2 have a rectangular shape with the length L4 and height H3.

In the Example, the thickness of the negative electrode 30, i.e., the thickness including the negative electrode core 31 and the negative electrode mixture 35, is Reference "1". The thickness of the negative electrode of Comparative Example 1 is equal to the thickness of the negative electrode 30 of the Example, and the thickness of the negative electrode of Comparative Example 2 is "1.02" unlike the thickness of the negative electrode 30 of the Example. In particular, in Comparative Example 2, more negative electrode mixture than the amount of negative electrode mixture in the Example was applied.

As described above, a negative electrode core molded into a predetermined shape is prepared (FIG. 4). Meanwhile, hydrogen absorbing alloy powder, which is an aggregate of hydrogen storage alloy particles described above, a conductive agent, a binding agent, and water are prepared, and these are blended to prepare a paste of negative electrode mixture. The resulting paste is applied to the negative electrode core and then dried. After drying, the density of the negative electrode mixture is adjusted to a predetermined value in a rolling step in which the negative electrode is entirely rolled, and the negative electrode is then produced. One hundred cells of such positive electrodes were manufactured.

[Electrode Group]

The positive electrode and negative electrode produced as described above are wound together into a spiral shape with the separator therebetween, forming a spiral electrode group. The electrode group obtained in this manner is housed in the outer can. Subsequently, a predetermined amount of alkaline electrolyte is filled into the outer can. Afterward, the outer can containing the electrode group and the alkaline electrolyte is sealed with a sealing body that has a positive terminal, yielding a battery. The battery is subjected to an initial activation process to be made ready for use.

[Short-Circuit and Discharge Capacity]

The battery thus manufactured was subjected to the test conditions described above, and the results shown in Table 1 above were obtained. As shown in Table 1 above, it was confirmed that the battery of the Example has a larger discharge capacity than the battery of Comparative Example 1 and fewer short-circuits than the battery of Comparative Example 2.

Although preferred embodiments have been described above, the present disclosure is not limited to the nickel-metal hydride secondary battery 1 of the embodiments, but includes all aspects included in the concept and claims of the present disclosure, and the configurations may be selectively combined as appropriate. In addition, the shape, material, position, size, and the like of each component in the embodiments may be changed as appropriate depending on the specific mode of the disclosure.

EXPLANATION OF REFERENCE SIGNS

1 Nickel-metal hydride secondary battery (alkaline storage battery)
10 Outer can
20 Positive electrode
22 Positive electrode body
23 Positive electrode protrusion
30 Negative electrode
32 Negative electrode body
33 Negative electrode protrusion
40 Separator
50 electrode group
60 Sealing body
70 Positive terminal

The invention claimed is:

1. An alkaline storage battery comprising:

an electrode group that includes a positive electrode with a belt shape, a negative electrode with a belt shape, and a separator with a belt shape and located between the positive electrode and the negative electrode, the positive electrode, the negative electrode, and the separator being stacked on top of each other to wind in a spiral shape such that a negative electrode active material of the negative electrode is exposed on an outermost surface of the electrode group;

an outer can with a bottomed cylindrical shape in which the electrode group is housed together with an alkaline electrolyte, the outer can having an opening at its top, wherein the outer can has an inner-side-surface that is electrically connected to the negative electrode by being in direct physical contact with the negative electrode active material exposed on the outermost surface of the electrode group;

a sealing body that seals the opening of the outer can; and a positive terminal electrically connected to the sealing body, wherein the positive electrode includes a positive electrode body with a belt shape and a positive electrode protrusion protruding from a portion of the positive electrode body toward the sealing body to connect electrically to the sealing body by being in direct physical contact with the sealing body, the positive electrode body and the positive electrode protrusion both being wound in the spiral shape with the negative electrode and the separator, the negative electrode includes a negative electrode body with a belt shape and a negative electrode protrusion protruding from a portion of the negative electrode body toward the sealing body and terminating between the sealing body and the negative electrode body, the positive electrode and the negative electrode have a positive electrode active material and a negative electrode active material, respectively, in portions facing each other with the separator therebetween, the positive electrode active material is disposed across the entirety of each surface of the positive electrode, including the positive electrode protrusion, that faces the negative electrode with the separator therebetween, the negative electrode active material is disposed across the entirety of each surface of the negative electrode, including the negative electrode protrusion, that faces the positive electrode with the separator therebetween, and the inner-side-surface of the outer can functions as a negative terminal without using a negative lead tab.

* * * * *